3,187,808
HIGH TEMPERATURE RECUPERATOR
Heinz A. Kuhne and Jobst W. Seehausen, Pittsburgh, and Theodor von Gebhardi, Allison Park, Pa., assignors to The American Schack Company, Inc., Pittsburgh, Pa., a corporation of Delaware
Filed May 23, 1962, Ser. No. 197,154
4 Claims. (Cl. 165—83)

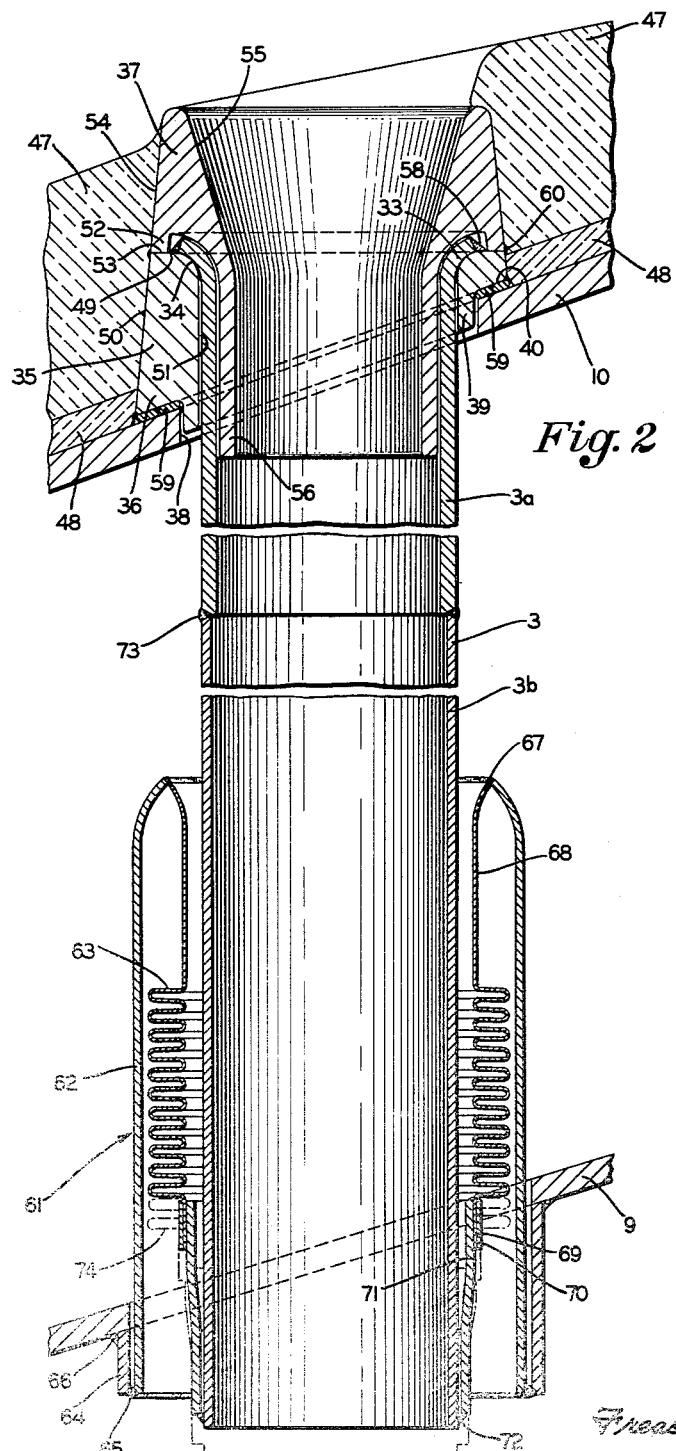
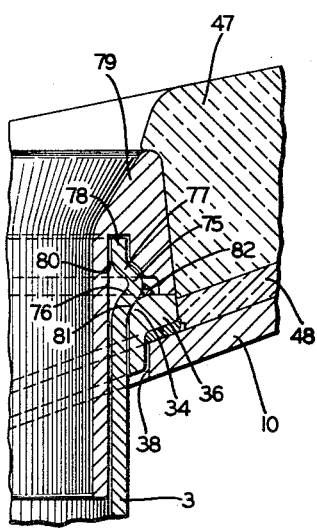
Fig. 2
Fig. 3

This invention relates to recuperators for combustion furnaces. More particularly it pertains to a counterflow-type of recuperator in which the heat exchange tubes carrying the hot waste gases are mounted in a readily detachable and fluid-tight manner.

Due to the high temperature at which products of combustion escape from industrial furnaces and to the large amount of air necessary for the combustion of the great quantities of fuel used, much of the heat generated in the furnace is carried away by the outgoing gases and is wasted, unless special devices are employed to recover the heat in the gases. In combustion furnaces of the continuous type the products of combustion leave at a high temperature and carry with them a large amount of heat which cannot be utilized again as fuel in the furnace. Much of the heat may, however, be recovered from the waste gases.

A recuperator is a heat-saving device in which heat flows constantly through one surface and out through the other surface of a wall separating one fluid from another. The fluids are (1) waste gaseous products of combustion which contain the heat escaping from a furnace, and (2) fuel gas or air for combustion which is preheated while passing through the recuperator. Inasmuch as considerable reduction of fuel consumed can be obtained by preheating combustion air, a considerable advantage in salvaging heat by a recuperator is derived. Thus, recuperators furnish a steady, uninterrupted flow of preheated air which results in a lower amount of fuel consumed.

Where the temperature of the waste gas from which heat is to be extracted is relatively low, say below 1700° F., metallic tubes may be used because they possess an advantage against interleakage between the heat exchange fluids. In the past it has been found that where recuperators are operated at higher temperatures a clay or silicon carbide material was used instead of metallic tubes, because of failure by cracking or by the improper shape of the recuperator tube or by the use of an improper alloy. The recuperator element or tube through which the heat exchange occurs must be of such a type that expansion and contraction during temperature changes cannot provide destructive stresses.

In recent years recuperators operating at higher temperatures have been provided with metallic tubes, notwithstanding inherent difficulties of expansion and contraction, because the metal surface constitutes the most efficient heat exchange wall between two heat exchange fluids. By providing tubes of special alloys, the life of a heat exchange tube may be extended considerably, even in recuperators operating at higher temperatures. However, other problems remain or are developed due to combinations of conditions. Among those problems is that of providing means for mounting the tubes in the recuperator in a readily replaceable manner.

Notwithstanding the greatly improved efficiency due to the use of special alloy heat exchange tubes in a recuperator, there remains the problem of erosion and corrosion of the tubes. That problem necessitates replacement of the tubes periodically in order to prevent interleakage of the heat exchange fluids. Since the tubes are exposed directly to the high temperature and friction of the hot gases, it is desirable to minimize as much as possible their failure due to cracking. Where a constant reducing atmosphere is maintained within the tubes carrying the waste gases, that problem is greatly diminished.

Associated with the foregoing is the related problem of providing adequate means for expansion and contraction of the recuperator tubes. Such tubes are normally mounted between two spaced tube sheets which are fixed in place and therefore do not yield with the expansion and contraction of the tubes due to temperature changes in the recuperator. It is therefore desirable to provide expansion means either on each tube or between the tube and a tube sheet.

Some recuperators are provided with tube sheets having a dished or concave configuration. In the past such a tube sheet has provided difficulties in creating and maintaining a fluid-tight joint between the tube and tube sheet due to stresses created by the weight of hanging vertical tubes at an acute angle to the tube sheet. Such prior constructions have included welded joints which have been of sufficient size to support the weight of the tube and to maintain fluid-tightness between the tube and the tube sheet.

The dish-shaped or concave tube sheet, however, has been subject to flexing and sagging due to the extreme heat to which it is exposed. As a result, the up and down flexing of the tube sheet has created undue stresses and ultimate fracture of the welded joint or the tube adajacent the joint. When a fracture occurs, the problem is immediately aggravated by interleakage between the heat exchange fluids which causes alternating oxidizing and reducing conditions, and requires frequent replacement of the tubes.

It has been found that the foregoing problems may be overcome by the provision of heat exchange tubes which are mounted in individual tube-receiving members adapted to the concave tube sheet and which are held in place primarily by the weight of the tube. Each tube is secured in the lower tube sheet by replaceable thermal expansion bellows means. The advantage of the bellows is that they may be installed with a predetermined compression which is dependent upon the length, coefficient of thermal expansion, and the temperature of operation of the tube. At operating temperature each tube, which is originally suspended in the upper tube sheet, expands thermally until the precompressed bellows are expanded. A greater part of the weight of all of the tubes in the recuperator is thereby transferred from the hot upper tube sheet to the cold lower tube sheet. Thus, as the recuperator is heated to operating temperature, the expansion joint gradually assumes more weight of the tube.

The foregoing construction also provides for upper and lower tube-to-tube-sheet joints that are readily replaceable. As a result, the amount of time during which the recuperator is out of operation due to replacement of the tubes is minimized and the lifetime efficiency of the recuperator is greatly increased.

Generally, it is an object of this invention to provide a high temperature recuperator in which heat exchange tubes are installed in a readily replaceable manner.

It is another object of this invention to provide a high temperature recuperator in which heat exchange tubes are provided with individual expansion joints which are installed with precompression to compensate for later thermal expansion of the tubes.

It is another object of this invention to provide a high temperature recuperator in which welded joints between vertical parts at the upper end of the tube are avoided by the provision of tubes having upper flared end portions which permit the tubes to be initially hung in place for easy installation.

It is another object of this invention to provide a high temperature recuperator in which a tube mounting member is provided at the upper end of the tube sheet, which member has an outwardly curved annular portion for receiving the outwardly curved upper end portion of the tube in a snug-fitting, substantially airtight manner.

It is another object of this invention to provide a high temperature recuperator in which the tube-mounting member encloses the upper end portion of each heat exchange tube and serves as a protective hood against the corrosive effect of the heat exchange fluids and thereby permits the provision of a simple weld between the tube and the member.

It is another object of this invention to provide a high temperature recuperator in which the normally upper end of each tube is further protected from the corrosive effects of the hot waste gases by a telescopically fitting extension of the member.

It is another object of this invention to provide a high temperature recuperator in which a tube-mounting member is composed of two easily replaceable portions.

It is another object of this invention to provide a high temperature recuperator in which the lower end of each tube is secured to the lower tube sheet by a readily replaceable expansion joint.

It is another object of this invention to provide a high temperature recuperator in which an expansion joint between each tube and the lower tube sheet is installed with a precalculated compression predetermined by the temperature of operation of the heat exchanger and which joint ultimately relieves the upper tube sheet from supporting the weight of the tubes by thermally expanding with the tube and absorbing a greater portion of the tube weight as the temperature of operation increases.

It is another object of this invention to provide a high temperature recuperator in which the means for mounting each sheet exchange tube to the upper and lower tube sheets is adaptable for use with single or double tube sheets and for tubes having heavier walls where necessary.

Finally, it is an object of this invention to provide a high temperature recuperator which substantially eliminates the problems enumerated and which obtains the foregoing desiderata in a simple and effective manner.

These and other objects and advantages apparent to those skilled in the art from the following description and claims may be obtained, the stated results achieved, and the described difficulties overcome by the discoveries, principles, apparatus, parts, elements, combinations, and subcombinations which comprise the present invention, the nature of which is set forth in the foregoing general statements, preferred embodiments of which—illustrative of the best modes in which applicants have contemplated applying the principles—are set forth in the following description and shown in the drawings, and which are particularly and distinctly pointed out and set forth in the appended claims forming part hereof.

The device of the present invention may be stated in general terms as including a recuperator having a vertical shell forming a heat exchange chamber and having inlet and outlet ports for one heat exchange fluid, a first tube sheet at one end of the shell and a second tube sheet at the other end of the shell, heat exchange tubes extending through the chamber and having end portions mounted in the tube sheets, first wall means attached to the end of the shell and forming an inlet header compartment which communicates with one end of the tubes, second wall means attached to the other end of the shell and forming an outlet header compartment which communicates with the other end of the tubes, the first tube sheet having a curved concave surface, the heat exchange tubes being suspended from the first tube sheet, means mounting the upper end of each heat exchange tube in the first tube sheet including a tube mounting member having upper and lower portions, the lower portion having a lower surface inclined at an angle equal to and mounted on the first tube sheet, the lower portion having a central bore with a cylindrical side wall having an upper end portion curved outwardly and terminating with a horizontal peripheral surface at the outer wall, the central bore of the lower portion having a diameter slightly greater than the diameter of a heat exchange tube, the upper end portion of the heat exchange tube being flared outwardly on a curve equal to that of the upper end portion of the bore of said lower portion, the outwardly flared upper end portion of the tube resting snugly upon the outturned surface of said lower portion in a substantially fluid-tight manner, the upper portion of the tube mounting member including a central bore having a lower cylindrical portion with a diameter slightly less than the inner diameter of the tube and extending telescopically into an upper end portion of the tube, the outer wall of the lower cylindrical portion of the upper portion having an intermediate outwardly curved surface having a radius slightly greater than the outwardly flared end portion of the tube, said outer surface of the upper portion terminating at the outer wall of the portion in a horizontal peripheral wall surface abuttable with the corresponding surface of the lower portion, thermal expansion means mounting the lower end of the tube in the second tube sheet, and bellows expansion joint means for mounting the lower end of each tube in the second tube sheet and for supporting the weight of the tube at operating temperatures of the recuperator by precompressing the bellows to compensate for subsequent expansion of the tube.

In the drawings which are illustrative of the preferred embodiments of the invention by way of example:

FIG. 2 is an enlarged fragmentary vertical sectional view of one heat exchange tube as installed in the recuperator shown in FIG. 1; and FIG. 3 is a fragmentary vertical sectional view showing another embodiment of the manner in which the upper end of the tube may be installed.

Similar numerals refer to similar parts throughout the several views of the drawings.

Figure 1:
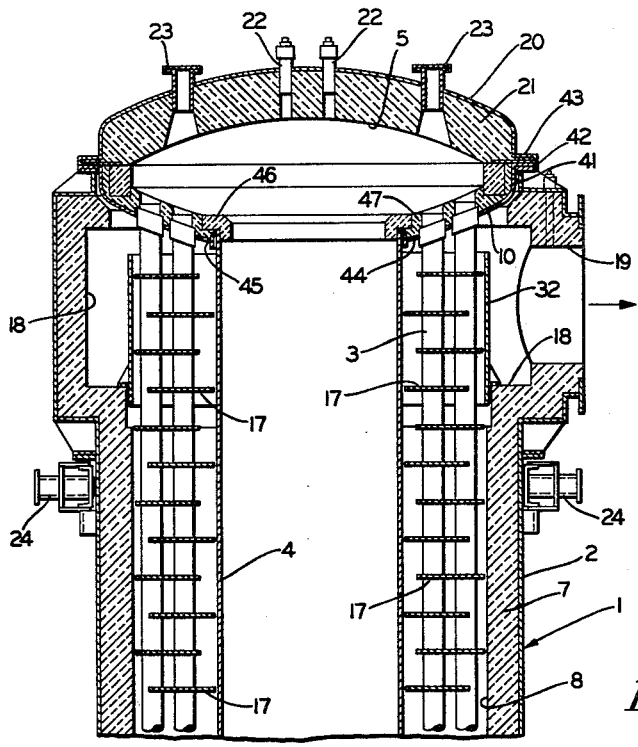
FIGURE 1 is a vertical sectional view showing a high temperature recuperator.
Figure 1:
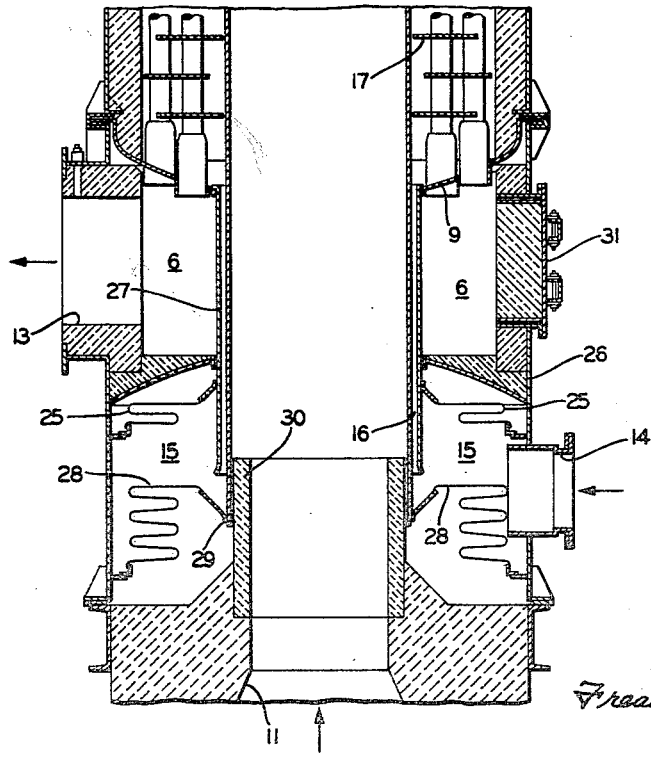

A recuperator is generally indicated at 1 in FIG. 1. It includes a vertical shell 2, a plurality of heat exchange tubes 3, a central gas conduit 4, an upper plenum chamber 5, and a lower plenum chamber 6. In addition, the shell 2 is provided with an insulation lining 7 and forms a shell chamber 8, the lower end of which is closed by a tube sheet 9 and the upper end of which is closed by a tube sheet 10.

Hot waste gases at about 2100° F. enter the recuperator 1 through a gas inlet 11 and travel upwardly through the central vertical conduit 4 to the plenum chamber 5 where the gases enter the upper end of the tubes 3 and move downwardly through the tubes through the chamber 6 from which they pass out of the recuperator 1 through a gas outlet 13 at a temperature of about 1075° F. Cold air enters the recuperator at room temperature through an air inlet 14 which communicates with an annular chamber 15 near the lower end of the recuperator. The cold air then enters an annular space 16 adjacent the lower end portion of the conduit 4 from where it moves into the lower end of the shell chamber 8 and travels upwardly in a zigzag path due to staggered baffle plates 17 in heat exchange contact with the tubes 3. At the upper end of the tubes 3 the heated air enters an annular chamber 18 from which it passes out of the recuperator through an outlet 19 at a temperature of about 1380° F.

As shown in FIG. 1, the upper end of the recuperator 1 is provided with a cover 20 having insulation lining 21 and forming the upper side of the plenum chamber 5. Various access ports 22 and observation ports 23 are provided in the cover 20. Below the chamber 18 lifting means or trunnions 24 are mounted on the shell 2 for lifting the entire recuperator when necessary.

The chamber 6 and 15 are separated by expansion means or bellows 25, the outer periphery of which is secured to a cylindrical support or base 26 and the inner periphery of which is secured to the outer surface of a cylindrical sleeve 27. Likewise, the lower end of the conduit 4 is provided with expansion means or bellows 28, the outer periphery of which is secured to the base 26 and the inner periphery of which is secured at 29 to the conduit 4 in an airtight manner. Accordingly, the bellows 25 and 28, being annular, provide the upper and lower sides of the annular air chamber 15.

Inasmuch as the recuperator 1 is subjected to high temperatures of operation, such as 2100° F., for incoming waste heat gases, all parts in direct contact with the gas are provided with expansion means such as the bellows 25 and 28, as well as a telescopic fitting between the lower end portion of the conduit 4 and a ceramic sleeve 30 with clearance therebetween to permit the thermal expansion and contraction.

The chamber 16 provides the sole means by which the cold air passes from the chamber 15 to the shell chamber 8. In that manner the colder incoming air serves to cool the sleeve 27 and prevent the heat of the hot gases from being transmitted to the colder gases in chamber 6 by convection and radiation.

As shown in FIG. 1, an inspection door 31 is provided for the chamber 6. At the upper end of the shell chamber 8 a cylindrical baffle plate 32 is provided to conduct the air to the uppermost end portion of the tubes 3 before the air is free to move into the surrounding chamber 18.

The manner in which a heat exchange tube 3 is mounted between tube sheets 9 and 10 is shown in FIG. 2. The upper end portion of each tube 3 is provided with an outturned or flared portion 33 which rests upon a corresponding outturned portion 34 of an adapter 35. The adapter is composed of a lower portion 36 and an upper portion 37 for mounting and securing the upper end of each tube in a fluid-tight manner on the tube sheet 10.

The tube sheet 10 is provided with a tube opening 38 for each tube 3. The diameter of each opening 38 is sufficiently larger than that of the tube 3 to provide clearance in which an annular flange or collar 39 of the lower portion 36 is seated. In that manner each tube 3 is properly centered in each tube opening 38. An annular undersurface 40 is provided around the collar 39 for resting upon the top surface of the tube sheet 10.

As shown in FIGS. 1 and 2, the tube sheet 10 is concave and extends inwardly from an outer peripheral portion 41 which includes a flange 42 by which the upper end of the shell is secured to a corresponding flange 43 of the cover 20. The tube sheet 10, being annular, includes an inner periphery 44 which is secured to the upper end of the conduit 4 at 45 in a fluid-tight manner. Though the tube sheet 10 is disclosed as dish-shaped, it may be a flat or horizontal member.

The metal-to-metal joint between the tube sheet 10 and the upper end of the conduit 4 is protected from the elevated temperatures of the hot gases flowing upwardly through the conduit 4 into the chamber 5 by insulating means which includes a ceramic collar 46 seated on the top of the conduit 4 as well as an insulation lining 47 which is coextensive with the tube sheet 10 and extends from the inner periphery of the joint 45 to the outer peripheral portion 41. A thinner layer 48 of insulating fiberglass (FIG. 2) is disposed between the tube sheet 10 and the lining 47.

Inasmuch as the tube sheet 10 is concave, the adapter lower portion 36 has a substantially wedge-shape configuration with the lower annular undersurface 40 being inclined at an angle to an upper horizontal surface 49. The surface 49 unites with the outturned surface 34 and extends radially outwardly to an outer surface 50 which is substantially cylindrical. Thus the horizontal and outturned surfaces 49 and 34 provide a horizontal plane from which the tube 3 is suspended. In that manner the lower end portion of each tube 3 hangs substantially centrally within an opening 51 (FIG. 2) in the lower tube sheet 9, the axes of the opening 51 and the opening 38 of the tube sheet 10 being substantially aligned on vertical axes.

The upper portion 37 of the adapter 35 includes an outer flange 52 which includes a horizontal undersurface 53 adapted for placement on the horizontal surface 49 of the member 36. In addition, the portion 37 includes an outer surface 54 aligned with the surface 50, and an inner inclined wall 55. Moreover, the upper portion 37 includes a cylindrical portion 56 which is telescopically disposed within the upper end portion of each tube 3.

The outer diameter of the cylindrical portion 56 is less than the inner diameter of the tube 3 and of the bore 51 of the lower portion 36 and thereby provides a cylindrical spacing in which the upper end portion of the tube 3 is disposed. The upper end portion of the outer surface of the cylindrical portion 56 is flared outwardly on a radius substantially concentric with those of the outturned portion 34 and the inner surface of the tube 3. Accordingly, the adapter 35 provides a receptacle in which the upper end portion of the tube 3 is seated and protected.

The adapter portions 36 and 37 provide an airtight fitting between each tube 3 and the tube sheet 10. The airtight fitting between the tube 3 and the adapter is primarily maintained by the snug fitting between the abutting surfaces of the outturned portions 33 and 34 of the tube and adapter. In addition, an annular weld 58 is provided between the upper end of the tube 3 and the horizontal surface 49 of the adapter portion 36.

Thus the weld 58 combines with the snug fit between the tube and the adapter to provide airtightness between the tube 3 and the adapter.

The cylindrical portion 56 extends telescopically down into the upper end portion of the tube 3 to protect the upper end of the tube and the weld 58 from the corrosive effect of the hot gases as they move downwardly through the tube 3.

The foregoing parts are assembled by installing the lower portion 36 of the adapter 35 and by inserting insulating rope 59 between the top surfaces of the tube sheet 10 and the annular undersurface 40 of each portion. The tube 3 is then lowered into place, the weld 58 is applied, the upper portion 37 is placed in position as shown, and a number of tack welds 60 are applied to hold the adapter portion 37 in place on the lower portion 36. Thereafter, the layer 48 of fiberglass is applied, after which the insulating lining 47, which is composed of a ramming mix, is secured in place.

As shown in FIG. 2, the lower end of the tube 3 is secured to the tube sheet 9 by means of a thermal expansion joint generally indicated at 61. The joint includes an outer sleeve 62 and a bellows 63. The lower end of the sleeve 62 is secured to an adapter ring 64 by an annular weld 65. The upper side of the ring 64 is secured to the undersurface of the tube sheet 9 by a weld 66. The upper end portion of the sleeve 62 is preferably turned inwardly and is secured by a weld 67 to the upper end of a cylindrical portion 68 of the bellows 63. A lower cylindrical portion 69 of the bellows is secured in a fluid-tight manner by a compression ring 70 to a sleeve 71, the lower end of which is secured by a weld 72 to the lower edge of the tube 3.

Although each tube 3 may be composed of a single tube member composed of one material, the tube may be composed of two or more members composed of different material, depending upon the requirements for exposure to varying temperatures of the hot waste gases. For example, as shown in FIG. 2, the tube 3 is composed of an upper sleeve portion 3a and a lower sleeve portion 3b, which portions may be composed of type 446 and type 430 stainless steels, respectively. Moreover, inasmuch as the gases yield considerable heat to the surrounding air, the lower portion 3b may be composed of a lighter gauge tubing than the upper portion 3a, which portions are preferably secured together by an annular weld 73.

When the expansion joint 61 is installed, the bellows 63 is compressed, as shown in the solid line position, to a precalculated degree in order to compensate for subsequent thermal expansion of the tube 3 which occurs during operation of the recuperator. The amount of precalculated compression of the bellows 63 is dependent upon the length of the tube 3, the thermal coefficient of expansion of the material comprising the tube, and the temperature at which the recuperator operates.

Accordingly, at operating temperature, the bellows 63 expands to the broken line position 74. At operating temperatures the bellows 63 in the extended position assumes support of a substantial portion of the weight of the tube 3 and thereby transmits a greater portion of the weight of the total tubes 3 from the tube sheet 10 to the tube sheet 9. Inasmuch as the upper tube sheet 10 is exposed to the higher temperatures of the waste heat gases than is the lower tube sheet 9, the upper tube sheet 10 requires increasing support for the tubes 3 as the temperature of the gases increases.

Moreover, at elevated temperatures the inner periphery 44 of the tube sheet 10 sags slightly downwardly and outwardly, which lower the tubes 3 and shifts additional weight of the tube to the expanded bellows 63 for each tube 3. When the tube sheet 10 sags at the inner periphery, the conduit 4 sags slightly, which is provided for by the bellows 28 at the lower end of the conduit.

Another embodiment of the tube 3 is shown in FIG. 3 in which the upper end portion of a tube has an expanded portion 75 with outturned and inturned portions 76 and 77. The inturned portion 77 terminates in an upper end 78 aligned with the greater lower portion of the tube. To accommodate the embodiment shown in FIG. 3, the adapter portion 36 is not altered; however, an upper adapter portion 79 is provided with an annular crevice 80 adapted to receive the upper end portion 78 and the inturned portion 77 of the tube 3. The outturned portion 76 is mounted on the outturned portion 34 at 81 in a snug fit which provides a substantially airtight fit between the adapter portion 36 and the tube 3. In addition, an annular weld 82 may be provided in a manner similar to the weld 58 (FIG. 2).

The device of the instant invention provides a recuperator for high temperature operation in which the heat exchange tubes are mounted in spaced tube sheets in a readily detachable manner. The device also provides an annular expansion joint between each tube and one tube sheet, which joint is replaceable by the application of two welds.

In addition, the device provides means for mounting tube sheets in a concave tube sheet, which means includes an annular tube-support member having an outwardly flared surface on which an outturned end of the tube is seated for supporting the tube and providing a snug airtight fit.

Accordingly, the foregoing construction permits the lower tube sheet to assume greater support of the tubes as the temperature of the recuperator increases, thereby relieving the hotter upper tube sheet of weight forces which would otherwise cause the tube sheet to sag out of its intended position.

In the foregoing description certain terms have been used for brevity, clearness and understanding, but no unnecessary limitations have been implied therefrom as such words are used for descriptive purposes and are intended to be broadly construed.

Moreover, the embodiment of the improved construction illustrated and described herein is by way of example and the scope of the present invention is not limited to the exact construction shown.

Having now described the invention, construction, operation and use of a preferred embodiment thereof and the advantageous, new and useful results obtained thereby; the new and useful high temperature recuperator and reasonable mechanical equivalents thereof obvious to those skilled in the art are set forth in the appended claims.

What is claimed is:

1. A high temperature recuperator including a vertical shell forming a heat exchange chamber and having inlet and outlet ports for one heat exchange fluid, an upper tube sheet at one end of the shell and a lower tube sheet at the other end of the shell, the upper tube sheet having a concave configuration and having a peripheral portion attached to the shell, the upper tube sheet having a central opening aligned with a similar opening in the lower tube sheet, a conduit extending through the heat exchange chamber, the upper end of the conduit being secured to the upper tube sheet around the central opening, the lower end of the conduit extending through the central opening of the lower tube sheet and being unattached thereto, heat exchange tubes extending through the chamber and having end portions mounted in the tube sheets, first end wall means attached to the end of the shell and spaced from the upper tube sheet and forming with said tube sheet an inlet header compartment which communicates with the tubes, second end wall means attached to the other end of the shell and spaced from the lower tube sheet and forming with said tube sheet an outlet header compartment which communicates with the tubes, means mounting the upper end of each heat exchange tube in the first tube sheet and including an annular member having an inner surface forming a bore and an outer surface, the member having a tube-receiving annular notch between the inner and outer surfaces, the member being mounted on the upper side of the first tube sheet and having a telescopic portion extending downwardly through a tube-receiving opening in the tube sheet, the annular notch opening downwardly and communicating with the heat exchange chamber, the upper end portion of the notch being flared outwardly, one tube extending into the notch of each annular member and having an outwardly flared upper end portion seated in the corresponding portion of the annular notch, and thermal expansion means for mounting the lower end of each tube in the lower tube sheet whereby the tube sheets, tubes, and conduit expand independently in response to varying temperature zones within the shell, and whereby the primary support of the tubes shifts from the upper tube sheet in a higher temperature zone to the lower tube sheet in a lower temperature zone as the overall recuperator operating temperature increases.

2. A high temperature recuperator including a vertical shell forming a heat exchange chamber and having inlet and outlet ports for one heat exchange fluid, a first tube sheet at one end of the shell and a second tube sheet at the other end of the shell, heat exchange tubes extending through the chamber and having end portions mounted in the tube sheets, first end wall means attached to one end of the shell and spaced from the first tube sheet and forming with said tube sheet an inlet header compartment which communicates with the tubes and having a peripheral portion attached to the shell, both tube sheets having aligned central openings, a conduit aligned with the openings and suspended from the first tube sheet, the conduit extending through the lower tube sheet opening and being unattached thereto, second wall means attached to the other end of the shell and spaced from the second tube sheet and forming with said tube sheet an outlet header compartment which communicates with the tubes, the first tube sheet having a curved concave surface, the heat exchange tubes being suspended from the first tube sheet, means mounting the upper end of each heat exchange tube in the first tube sheet including a tube mounting member having upper and lower portions, the lower portion having a lower surface inclined at an angle equal to and mounted on the first tube sheet, the lower portion having a central bore with a cylindrical side wall having an upper end portion curved outwardly and terminating with a horizontal peripheral surface at the outer wall, the central bore of the lower portion having a diameter slightly greater than the diameter of a heat exchange tube, the upper end portion of the heat exchange tube being flared outwardly on a curve equal to that of the upper end portion of the bore of said lower portion, the outwardly flared upper end portion of the tube resting snugly upon the outturned surface of said lower portion in a substantially fluid-tight manner, the upper portion of the tube mounting member including a central bore the upper end of which has the shape of a truncated cone and the lower portion of which is cylindrical and has a diameter slightly less than the inner diameter of the tube and extends telescopically therein to a level below the outturned flared end portion of the tube, the outer wall of the lower cylindrical portion of the upper portion having an intermediate outwardly curved surface having a radius slightly greater than the outwardly flared end portion of the tube, said outer surface of the upper portion terminating at the outer wall of the portion in a horizontal peripheral wall surface abuttable with the corresponding surface of the lower portion, and thermal expansion means mounting the lower end of the tube in the second tube sheet, whereby the tube sheets, tubes, and conduit expand independently in response to varying temperature zones within the shell, and whereby the primary support of the tubes shifts from the upper tube sheet in a higher temperature zone to the lower tube sheet in a lower temperature zone as the overall recuperator operating temperature increases.

3. A high temperature recuperator including a vertical shell forming a heat exchange chamber and having inlet and outlet ports for one heat exchange fluid, upper and lower end walls closing corresponding ends of the shell, an upper tube sheet inwardly spaced from the upper end wall and forming an upper header compartment therewith, a lower tube sheet inwardly spaced from the lower end wall and forming a lower header compartment, the upper and lower tube sheets having centrally aligned apertures, a conduit for another heat exchange fluid having an upper end mounted on the upper tube sheet and communicating with the upper compartment through the central aperture, the lower end portion of the conduit extending through the lower tube sheet aperture and the lower end wall, inlet and outlet port means for said other heat exchange fluid communicating with the lower end of the conduit and with the lower compartment, heat exchange tubes extending through the chamber and having end portions mounted in the tube sheets, thermal expansion means mounting the lower end of each tube in the lower tube sheet and including an annular bellows having one side connected to the tube and the other side connected to the lower tube sheet, the upper tube sheet being inclined inwardly and downwardly from its periphery to the central aperture, the upper tube sheet being secured in place only by connection of the tube sheet periphery to the shell, the upper tube sheet being composed of metal and being expandable downwardly and contractable upwardly in response to thermal changes in the recuperator, the conduit being vertically movable with the upward and downward thermal movements of the upper tube sheet, and the bellows supporting a greater portion of the weight of the heat exchange tubes on the lower tube sheet upon expansion of the upper tube sheet, whereby the tube sheets, tubes, and conduit expand independently in response to varying temperature zones within the shell, and whereby the primary support of the tubes shifts from the upper tube sheet in a higher temperature zone to the lower tube sheet in a lower temperature zone as the overall recuperator operating temperature increases.

4. A high temperature recuperator including a shell forming a heat exchange chamber and having inlet and outlet ports for one heat exchange fluid, an upper tube sheet at one end of the shell and a lower tube sheet at the other end of the shell, both tube sheets being spaced inwardly from the ends of the shell, each tube sheet having a peripheral portion that is secured to the shell, each tube sheet being dish-shaped and having a central opening aligned with the opening of the other tube sheet, a central conduit extending through the heat exchange chamber, the upper end of the conduit being secured to the upper tube sheet portion around the central opening, the lower end of the conduit extending through the lower tube sheet opening and being free for thermal movement therewith, heat exchange tubes extending through the chamber and having end portions mounted in the tube sheets, means mounting the tubes in the upper tube sheet and including a collar having a cylindrical wall, the collar having upper and lower ends, the lower end of the collar being inclined at an angle corresponding to the angle of the dish-shaped tube sheet, the upper end of the collar being horizontal, the cylindrical wall of the collar having an outwardly flared surface joining the upper end of the collar, each tube being telescopically disposed in a corresponding collar and having an upper end portion flared outwardly and mounted on the corresponding surface of the collar in an air-tight manner, end wall means at each end of the shell and forming end compartments with corresponding tube sheets which compartments communicate with the heat exchange tubes, inlet and outlet port means for another heat exchange fluid and communicating with said end compartments, and thermal expansion means mounting the lower end of each tube in the lower tube sheet, whereby the tube sheets, tubes, and conduit expand independently in response to varying temperature zones within the shell, and whereby the primary support of the tubes shifts from the upper tube sheet in a higher temperature zone to the lower tube sheet in a lower temperature zone as the overall recuperator operating temperature increases.

References Cited by the Examiner

UNITED STATES PATENTS

| 1,941,194 | 12/33 | Wilkinson | 165—178 X |
| 2,001,663 | 5/35 | Carlson | 165—82 X |
| 2,197,793 | 4/40 | Everett | 287—20.3 X |
| 2,729,433 | 1/56 | Berg | 165—145 X |
| 2,942,855 | 6/60 | Wellensiek | 165—135 X |

FOREIGN PATENTS

| 1,026,716 | 2/53 | France. |

CHARLES SUKALO, *Primary Examiner.*